United States Patent [19]

Shimura

[11] Patent Number: 5,072,817

[45] Date of Patent: Dec. 17, 1991

[54] ELECTROMAGNETIC CLUTCH

[75] Inventor: Keiichi Shimura, Isesaski, Japan

[73] Assignee: Sanden Corporation, Gunma, Japan

[21] Appl. No.: 542,040

[22] Filed: Jun. 22, 1990

[30] Foreign Application Priority Data

Jun. 22, 1989 [JP] Japan .................. 1-72450[U]

[51] Int. Cl.$^5$ .................. 192 107 R; 335 296; F16D 27/112

[52] U.S. Cl. .................. 192/84 C

[58] Field of Search .............. 192/84 C, 84 T, 84 A, 192/84 B, 107 R; 335/281, 296, 297; 474/166, 195; 29/892, 892.1, 892.11, 892.2, 892.3

[56] References Cited

U.S. PATENT DOCUMENTS

| 3,137,177 | 6/1964 | Barnett | 474/195 X |
| 4,314,472 | 2/1982 | Saegusa et al. | 72/341 |
| 4,425,520 | 1/1984 | Hiraga | 192/84 C X |
| 4,552,005 | 11/1985 | Matsushita | 72/68 |
| 4,553,690 | 11/1985 | Nakamura | 29/159 R |
| 4,564,137 | 1/1986 | Nakamura | 228/173.6 |
| 4,891,619 | 1/1990 | Booth et al. | 335/296 |
| 4,892,176 | 1/1990 | Takashi et al. | 192/84 C |

FOREIGN PATENT DOCUMENTS

| 154230 | 9/1985 | European Pat. Off. | |
| 63-243534 | 10/1988 | Japan | 192/84 C |
| 2194823 | 3/1988 | United Kingdom | |

Primary Examiner—Richard Lorence
Attorney, Agent, or Firm—Banner, Birch, McKie and Beckett

[57] ABSTRACT

An electromagnetic clutch includes a first rotatable member rotatably supported on a first bearing. The first rotatable member is provided with at least one annular groove along an outer surface thereof for receiving a belt rotatably connecting the first rotatable member to an external driving source. The first rotatable member further has an inner and outer cylindrical annular portions and a magnetic axial end plate connecting the cylindrical annular portions at an axial one end. The magnetic axial end plate has a plurality of arcuate slits disposed on at least one circle. A plurality of remaining regions are located between each pair of adjacent slits. A second rotatable member is rotatably supported on a second bearing. An annular magnetic member is supported on the second rotatable member so as to be capable of limited axial movement. The annular magnetic member faces the axial end plate of the first rotatable member with an axial gap therebetween. An electromagnet is associated with the first rotatable members and the annular magnetic member for attracting the other of the rotatable members and the annular magnetic member. The remaining regions are mechanically reinforced by increasing the thicknesses thereof.

23 Claims, 6 Drawing Sheets

ELECTROMAGNETIC CLUTCH

BACKGROUND OF THE INVENTION

1. Field of the Invention

This invention generally relates to an electromagnetic clutch, and more particularly, to a mechanically reinforced rotor which can cope with increased tension in the driving belt.

2. Description of the Prior Art

Electromagnetic clutches are well known in the prior art and are often used for controlling the transfer of power from an automobile engine to the refrigerant compressor of an automobile air conditioning system. One such electromagnetic clutch is disclosed in Japanese Utility Model Application Publication No. 63-42936 which correspondes to U.S. Pat. No. 4,892,176.

Figure 1:
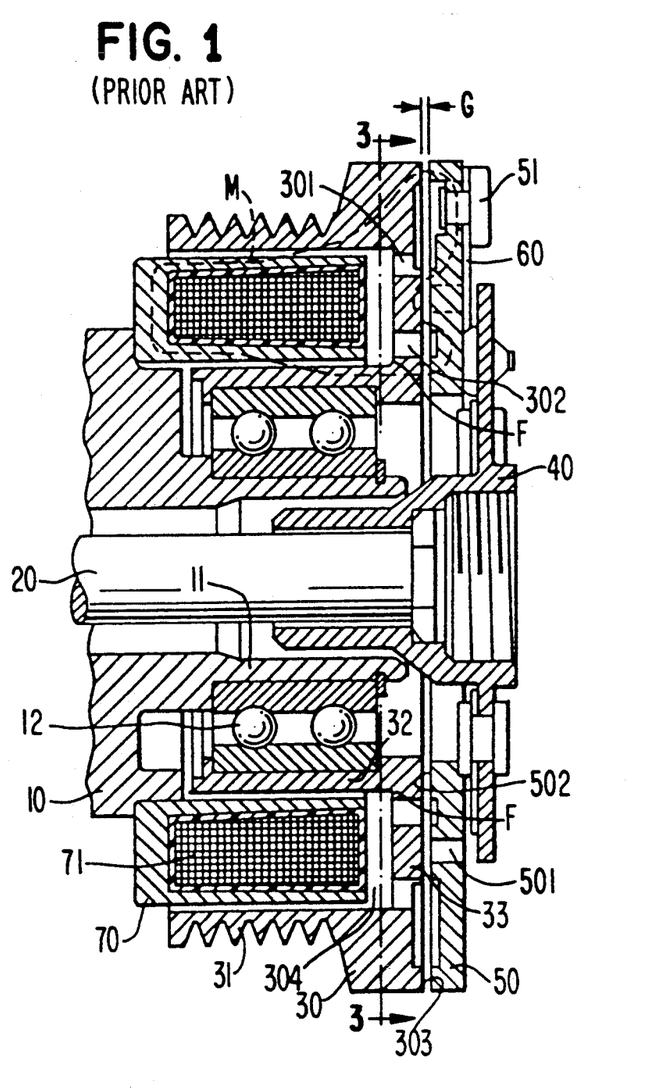
FIG. 1 is a vertical cross-sectional view of a prior art electromagnetic clutch.

The construction of an electromagnetic clutch disclosed in the '936 Japanese Utility Model is shown in FIG. 1. With reference to FIG. 1, the clutch assembly is disposed on the outer peripheral portion of annular tubular extension 11, which projects from an end surface of compressor housing 10 to surround drive shaft 20. Drive shaft 20 is rotatably supported in compressor housing 10 by a bearing (not shown). The clutch assembly includes rotor 30 rotatably mounted on tubular extension 11 by bearing 12.

Figure 3:
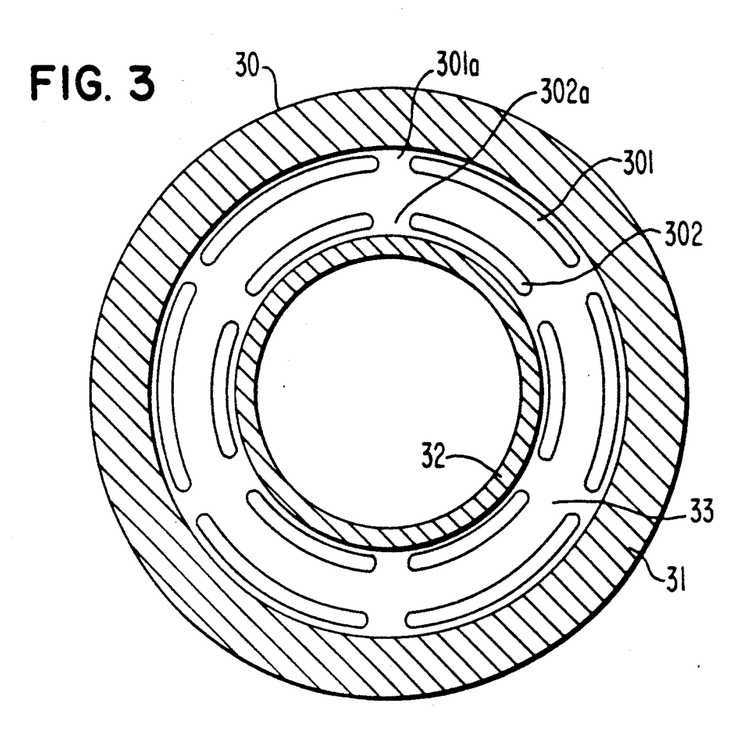
FIG. 3 is a cross-sectional view of a rotor taken along line 3—3 of FIG. 1.

Rotor 30 is coupled to the automobile engine (not shown) through a belt (not shown). Rotor 30 has a U-shaped configuration in its sectional side view, and includes outer cylindrical portion 31, inner cylindrical portion 32, and axial end plate portion 33. End plate portion 33 connects the outer and inner cylindrical portions 31 and 32 at one axial end. Axial end plate portion 33 is provided with a plurality of concentric arcuate slits 301, 302, which are disposed on outer and inner concentric circles, respectively. Slits 301, 302 are angularly synchronized and oriented of equiangular intervals as shown in FIG. 3. This construction forms magnetic pole face 303.

Hub 40 is fixed to the outer terminal end of drive shaft 20 extending beyond tubular extension 11. Armature plate 50 is movably connected to hub 40 by a plurality of leaf springs 60. As discussed below, leaf springs 60 permit axial movement of armature plate 50 toward pole face 303. Leaf springs 60 are fixed to the outer surface of armature plate 50 by rivets 51. The axial end surface of armature plate 50 faces pole face 303 of rotor 30 with a predetermined axial air gap "G" therebetween. The axial end surface of armature plate 50 is provided with concentric arcuate slits 501, forming pole face 502. Slits 501 are positioned to be opposite the midway point between slits 301, 302 on pole face 303.

Electromagnet 70 is mounted on compressor housing 10 concentric with drive shaft 20. Electromagnet 70, including the electromagnetic coil 71 provided therewithin, is disposed within annular hollow portion 304 of rotor 30 such that is surrounded by an air gap. When coil 71 of electromagnet 70 is energized, pole face 502 is attracted to pole face 303. Thus, drive shaft 20 rotates as rotor 30 is turned by the engine. If coil 71 of electromagnet 70 is not energized, pole face 502 of armature plate 50 is separated from pole face 303 of rotor 30 by the recoil strength of leaf springs 60. Rotor 30 still rotates in reponse to the engine output, but drive shaft 20 is not turned.

In the above construction of the electromagnetic clutch, magnetic flux "M", which is produced around electromagnet 70 by the energizing of electromagnetic coil 71, passes through a magnetic passageway formed within electromagnet 70, rotor 30 and armature plate 50 as indicated by the dotted line FIG. 1.

Figure 2:
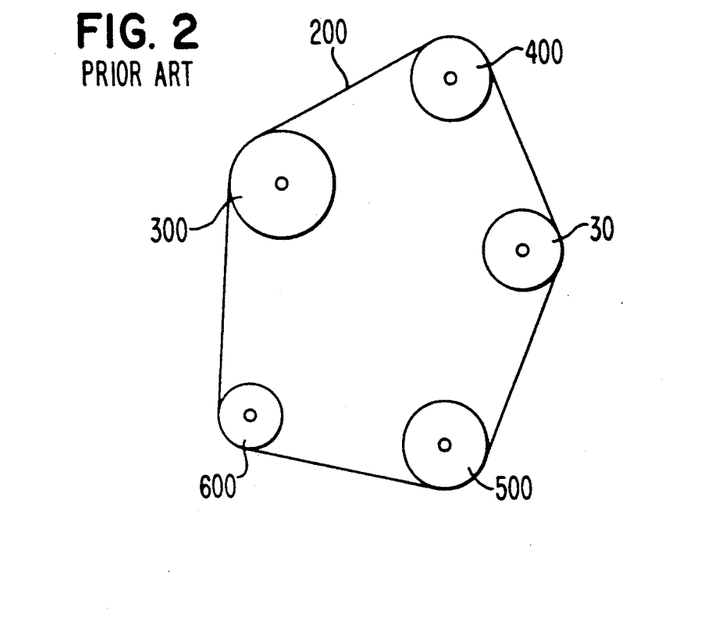
FIG. 2 is a schematic arrangement plan of pulleys or rotors which are associated with the driving source and the driven devices driven by the driving source, respectively.

In recent years, in order to effectively utilize the restricted vacant space in an automobile engine compartment, the respective pulleys or rotors associated with the automobile engine and devices deriving power from the engine (such as, an automobile generator, an oil hydraulic pump used for a power assisted steering wheel, and the refrigerant compressor) receive only one driving belt as shown in FIG. 2. With reference to FIG. 2, pulleys 300, 400, and 500 are associated with the automobile engine, the automobile generator and the oil hydraulic pump, respectively. Rotor 30 is one of the rotatable members of the electromagnetic clutch which is associated with the refrigerant compressor. Pulley 600 is a so-called "idle pulley", which is used for adjusting the tension in driving belt 200. Driving belt 200 is sequentially received by pulley 300, pulley 400, rotor 30, pulley 500, and pulley 600. When driving belt 200 is received by pulleys 300, 400, 500 and 600 and rotor 30, the tension of driving belt 200 is adjusted to an increased level to avoid a reduction in the capacity of transferring the driving power from the automobile engine to the automobile generator, the oil hydraulic pump and the refrigerant compressor.

Specifically, an increased tension in the driving belt generates a force which seriously tends to nutate rotor 30. As a result of the rotor'U-shaped configuration undesirable metal fatigue occurs at a certain circumferential portion "F" of axial end plate portion 33 of rotor 30. The circumferential portion F lies adjacent the inner circular arc of slits 302 disposed on the inner concentric circle. As can be appreciated, such fatigue causes serious damage to rotor 30.

In order to resolve this drawback, rotor 30 must be mechanically reinforced. However, when rotor 30 is mechanically reinforced by increasing the thickness of axial end plate portion 33, the increased weight of rotor 30 will be above a negligible amount. In addition, an increase in the thickness of axial end plate portion 33 makes the blanking process for forming slits 301 and 302 more difficult. Furthermore, when rotor 30 is mechanically reinforced by increasing the arcuate distance of each remaining region 301a, 302a located between adjacent arcuate ends of slits 301, 302, a resulting decrease of magnetic attraction force acting between pole faces 502 and 303 will be above a negligible amount.

SUMMARY OF THE INVENTION

Accordingly, it is an object of this invention to provide an electromagnetic clutch having a mechanically reinforced rotor which can cope with increased tension in a driving belt without a corresponding increase in its own weight.

It is another object of this invention to provide an electromagnetic clutch having a mechanically reinforced rotor which can cope with increased tension in a driving belt without a corresponding decrease of magnetic attraction force acting between the armature plate and the rotor.

An electromagnetic clutch according to the present invention includes a first rotatable member, a second rotatable member, and an annular armature plate. The armature plate is composed of magnetic material and is connected to the second rotatable member so that the annular armature plate is capable of limited axial movement. The first rotatable member comprises a first cylindrical annular portion, a second cylindrical annular portion concentrically disposed within the first annular portion, and an annular end plate composed of magnetic material and connecting one axial end of each of the first and second cylindrical annular portions. The first and second cylindrical annular portions and the annular end plate collectively define an annular cavity. The annular end plate further defines a plurality of arcuate slits which are disposed on a first and second circles concentrically positioned with said cylindrical annular portions. A plurality of remaining regions are located between each pair of adjacent arcuate ends of the slits disposed on each circle. The armature plate faces the annular end plate of the first rotatable member such that an axial air gap is defined therebetween. An electromagnet is disposed within the annular cavity to attract the armature plate into contact with the annular end plate such that rotation of the first rotatable member can be transmitted to the second rotatable member through the armature plate when said electromagnet is activated. At least a portion of the remaining regions being thicker than the other portions of the annular end plate.

DETAILED DESCRIPTION

Figure 4:
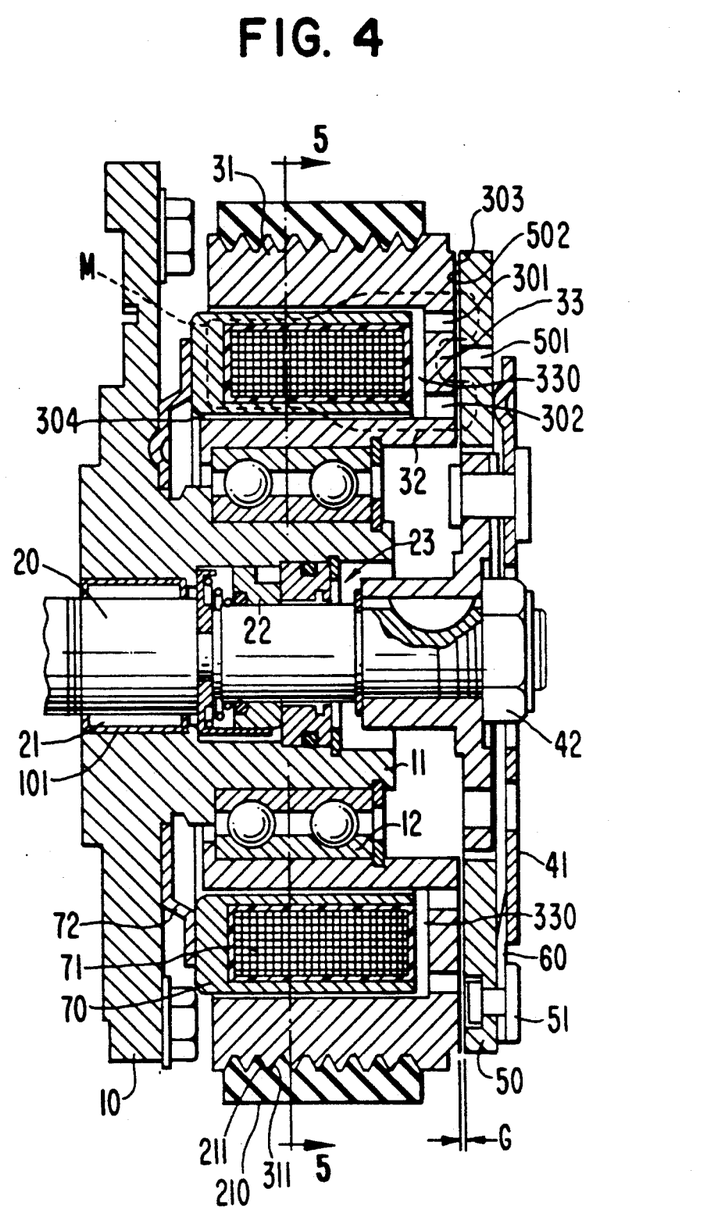
FIG. 4 is a vertical cross-sectional view of an eletromagnetic clutch in accordance with a first embodiment of the present invention.

The construction of an electromagnetic clutch in accordance with a first embodiment of this invention is shown in FIG. 4. In the drawing, the same numerals are used to denote the corresponding elements shown in FIG. 1. Further elements shown in FIG. 4 are as described below.

Opening 101 is formed at the center of the end surface of compressor housing 10. Needle bearing 21 is disposed in an annular peripheral wall of opening 101 for rotatably supporting drive shaft 20. Annular member 72 is disposed around annular tubular extension 11 and is used for firmly attaching electromagnet 70 to the end surface of compressor housing 10. Shaft seal assembly 22 is disposed in cavity 23 defined by annular tubular extension 11. Stopper plate 41, fixed at an outer end of drive shaft 20 by nut 42, supports armature plate 50 through a plurality of leaf springs 60. An outer peripheral surface of outer cylindrical portion 31 of rotor 30 receives flat belt 210 which couples rotor 30 to a rotatable member of a driving source, for example, a drive shaft (not shown) of the automobile engine. Flat belt 210 is provided with a plurality of U-shaped grooves 211 formed along its inner peripheral surface. Outer cylindrical portion 31 of rotor 30 is also provided with a plurality of U-shaped grooves 311 formed along its outer peripheral surface so as to firmly receive U-shaped grooves 211 of flat belt 210. In general, flat belts are more useful and durable than V-shaped belts when they are sequentially received by a plurality of pulleys.

Figure 5:
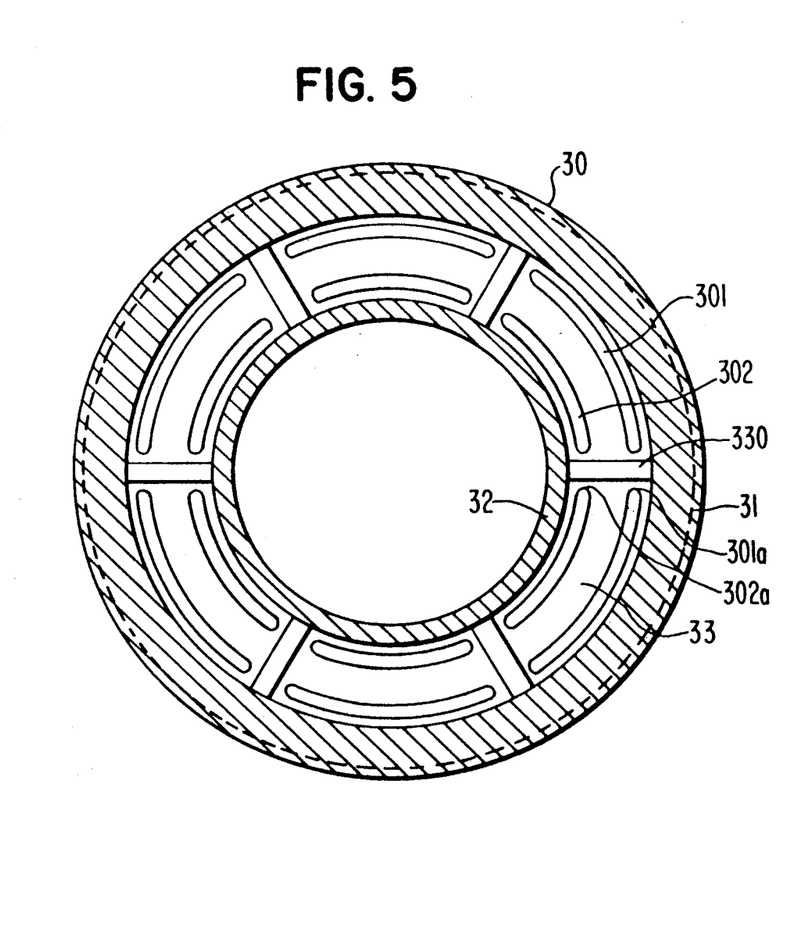
FIG. 5 is a cross-sectional view of the rotor taken along line 5—5 of FIG. 4.

With additional reference to FIG. 5, rotor 30 is provided with a plurality of rectangular parallelepiped members 330 for mechanical reinforcement. The parallelepiped members 330 are integrated with rotor 30 and oriented such that each radially extends from inner cylindrical portion 32 to outer cylindrical portion 31 along remaining regions 302a and 301a. The ends of the rectangular parallelepiped members 330 are spaced apart from electromagnetic 70 so that the axial air gap remains therebetween. Hence, with this construction, undersirable metal fatigue of rotor 30 is sufficiently prevented when flat belt 210 is used under high tension. Moreover, the enhanced resistance of rotor 30 is achieved without virtually any increase in the rotor's weight or decrease of magnetic attraction force acting between pole faces 502 and 303.

Figure 6:
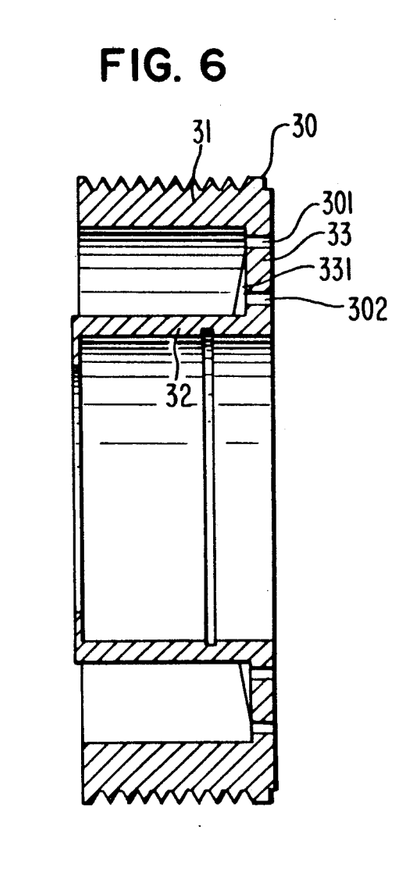
FIG. 6 is a vertical cross-sectional view of the rotor of the electromagnetic clutch in accordance with a modified first embodiment of the present invention.

FIG. 6 illustrates a modified first embodiment of this invention. With reference to FIG. 6, rotor 30 is provided with a plurality of wedge-shaped members 331. Each wedge-shaped member 331 radially extends along a remaining region 302a from inner cylindrical portion 32 to approximately two-thirds of the way across axial end plate 33. Additionally, each wedge-shaped member tapers toward outer cylindrical portion 31. The tapered end of each wedge-shaped member 331 is adjacent to an inner circular arc of slit 301.

Figure 7:
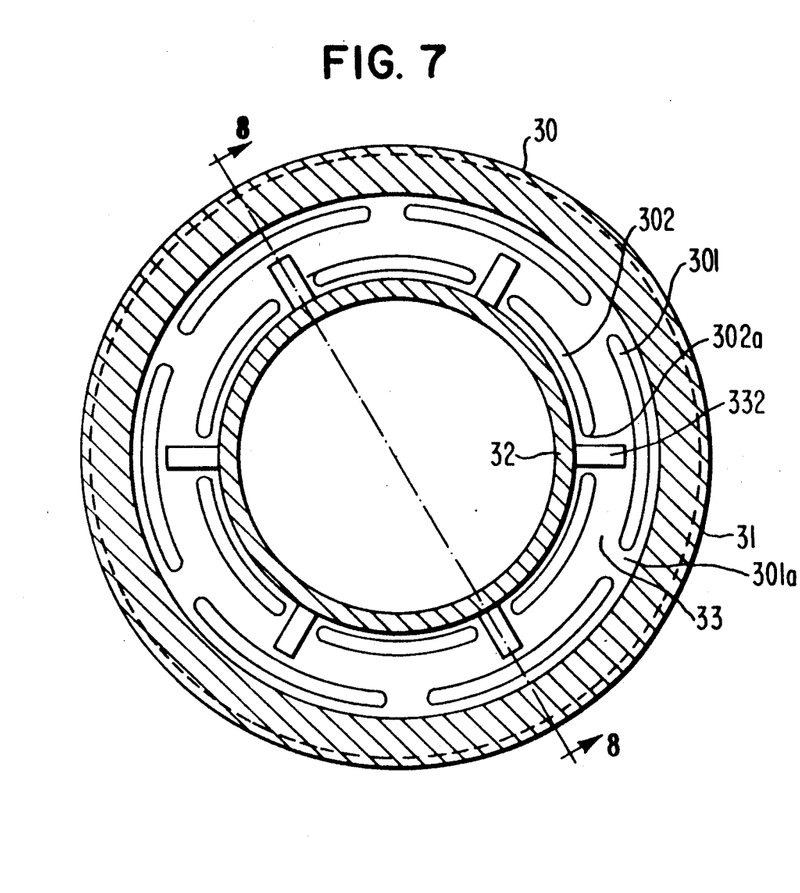
FIG. 7 is a view similar to FIG. 5 showing the rotor of the electromagnetic clutch in accordance with a second embodiment of the present invention.
Figure 8:
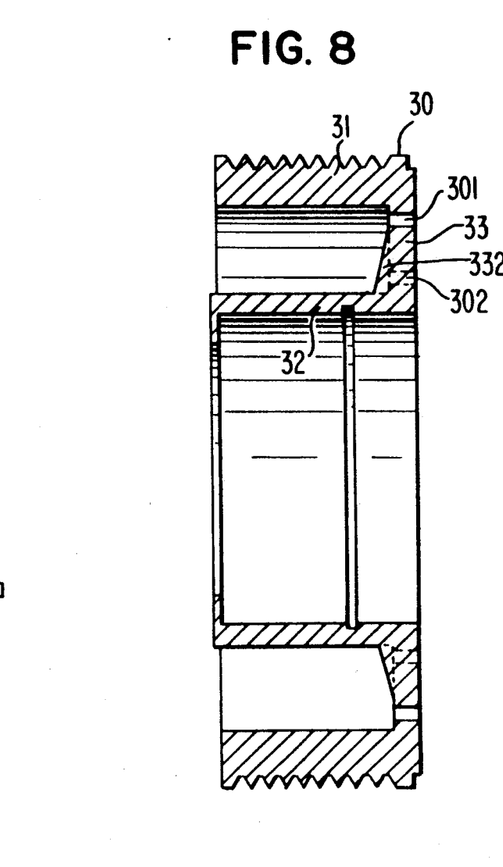
FIG. 8 is a cross-sectional view taken along line 8—8 of FIG. 7.

FIGS. 7 and 8 illustrate a second embodiment of this invention. With reference to FIGS. 7 and 8, remaining regions 301a and 302a are angularly shifted relative to each other. Rotor 30 is provided with a plurality of wedge-shaped members 332. Each wedge-shaped member 332 radially extends along a remaining region 302a from inner cylindrical portion 32 to approximately two-thirds of the way across axial end plate 33. Additionally, each wedge-shaped member 332 tapers toward outer cylindrical portion 31. The tapered end of each wedge-shaped member 332 is adjacent to the inner circular arc of slit 301.

Figure 9:
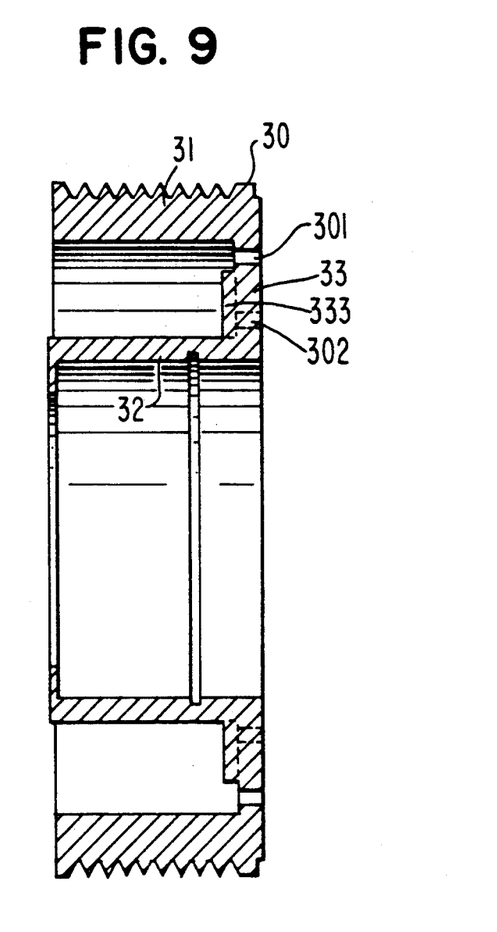
FIG. 9 is a view similar to FIG. 8 showing the rotor of the electromagnetic clutch in accordance with a modified second embodiment of the present invention.

FIG. 9 illustrates a modified second embodiment of this invention. With reference to FIG. 9, rotor 30 is provided with a plurality of rectangular parallelepiped members 333. Each parallelepiped member 333 radially extends from inner cylindrical portion 32 to approximately two-thirds of the way across axial end plate 33 along a remaining region 302a. The outer radial ends of parallelepiped members 333 are adjacent to the inner circular arc of slit 301.

The effect of the above three embodiments is similar to the effect of the first embodiment. Therefore, description of the effect of the above three embodiments is omitted.

This invention has been described in connection with the preferred embodiments. These embodiments, however, are merely for example only and the invention is not restricted thereto. It will be understood by those skilled in the art that other variations and modifications can be easily made within the scope in this invention as defined by the claims.

I claim:

1. In an electromagnetic clutch including a first rotatable member, a second rotatable member, an annular armature plate of magnetic material connected to said rotatable member so that said annular armature plate is capable of limited axial movement and an electromagnet, said first rotatable member comprising a first cylindrical annular portion, a second cylindrical annular portion concentrically disposed within said first cylindrical annular portion and an annular end plate of magnetic material connecting one axial end of each of said first and second cylindrical annular portions, said first and second cylindrical annular portions and said annular end plate defining an annular cavity, said annular end plate being provided with a plurality of arcuate slits which are disposed on at least one circle concentric with said cylindrical annular portions and a plurality of remaining regions located between adjacent arcuate ends of said slits, said annular armature plate facing said annular end plate of said first rotatable member with an axial air gap therebetween, said electromagnet being disposed within said annular cavity and operable to attract said annular armature plate into contact with said annular end plate such that the rotation of said first rotatable member can be transmitted to said second rotatable member through said annular armature plate when said electromagnet is activated, the improvement comprising:

said remaining regions of said annular end plate being axially thicker than substantially all other portions of said annular end plate.

2. In an electromagnetic clutch including a first rotatable member, a second rotatable member, an annular armature plate of magnetic material connected to said second rotatable member so that said annular armature plate is capable of limited axial movement and an electromagnet, said first rotatable member comprising a first cylindrical annular portion, a second cylindrical annular portion of which an outer diameter is smaller than an inner diameter of said first cylindrical annular member and an annular end plate of magnetic material connecting one axial end of each of said first and second cylindrical annular portions, said first and second cylindrical annular portions and said annular end plate defining an annular cavity, said annular end plate defining a plurality of arcuate slits which are disposed on first and second circles concentric with said cylindrical annular portions, a diameter of said first circle being greater than a diameter of said second circle, a plurality of first remaining regions being located between adjacent arcuate ends of said slits disposed on said first circle, and a plurality of second remaining regions being located between adjacent arcuate ends of said slits disposed on said second circle, said annular armature plate facing said annular end plate of said first rotatable member with an axial air gap therebetween, said electromagnet being disposed within said annular cavity and operable to attract said annular armature plate into contact with said annular end plate such that the rotation of said first rotatable member can be transmitted to said second rotatable member through said annular armature plate when said electromagnetic means is activated, the improvement comprising:

at least said second remaining regions being axially thicker than substantially all other portions of said annular end plate.

3. The electromagnetic clutch of claim 2 wherein said thicker remaining region of said first rotatable member is defined by a plurality of projections projecting from one end surface of said second remaining regions opposite to said annular armature plate, respectively.

4. The electromagnetic clutch of claim 3 wherein each said projection is a rectangular parallelepiped.

5. The electromagnetic clutch of claim 4 wherein each said projection extends radially from an outer peripheral surface of said second cylindrical annular portion to a portion adjacent to an inner circular arc of one of said slits disposed on said first circle.

6. The electromagnetic clutch of claim 3 wherein said projection is wedge shaped.

7. The electromagnetic clutch of claim 6 wherein each said projection is tapered toward said first cylindrical annular member.

8. The electromagnetic clutch of claim 7 wherein each said projection extends radially from an outer peripheral surface of said second cylindrical annular portion to a portion adjacent to an inner circular arc of one of said slits disposed on said first cirlce.

9. The electromagnetic clutch of claim 2 wherein said arcuate slits are disposed on said first and second circles at equiangular intervals.

10. The electromagnetic clutch of claim 9 wherein said arcuate slits disposed on said first circle are angularly synchronized with said arcuate slits disposed on said second circle.

11. The electromagnetic clutch of claim 10 wherein said first rotatable member is provided with an plurality of projections projecting from one end surface along said first and second remaining regions opposite to said annular armature plate.

12. The electromagnetic clutch of claim 11 wherein each said projection is a rectangular parallelepiped.

13. The electromagnetic clutch of claim 12 wherein each said projection extends from an outer peripheral surface of said second cylindrical annular portion to an inner peripheral surface of said first cylindrical annular portion.

14. The electromagnetic clutch of claim 11 wherein each said projection is wedge shaped.

15. The electromagnetic clutch of claim 14 wherein each said projection is tapered toward said first cylindrical annular portion.

16. The electromagnetic clutch of claim 15 wherein each said projection extends radially from an outer peripheral surface of said second cylindrical annular portion to a portion adjacent to an inner circular arc of one of said arcuate slits disposed on said first circle.

17. The electromagnetic clutch of claim 9, wherein said arcuate slits disposed on said first circle are angularly shifted with respect to said arcuate slits disposed on said second circle.

18. An electromagnetic clutch comprising a first rotatable member, a second rotatable member, an armature plate and an electromagnet, said armature plate being connected to said second rotatable member such that said armature plate is axially moveable relative thereto, said first rotatable member including an end plate defining a plurality of arcuate slits and a plurality of remaining regions between each pair of adjacent slits, said plate portion of said first rotatable member being disposed opposite to said armature plate such that a gap is defined therebetween, said electromagnet being operable to attract said armature plate toward said plate portion of said first rotatable member so that said armature plate and said second rotatable member rotate with said first rotatable member when said electromagnet is activated, the improvement comprising a plurality of reinforcing elements attached to portions of said end plate of said first rotatable member, said reinforcing elements being positioned in general radial alignment with said remaining regions so that said plate portions with said reinforcing elements have a thicker dimension than substantially all other portions of said end plate.

19. The electromagnetic clutch of claim 18 wherein said end plate of said first rotatable member defines said slits on at least one circle and wherein said reinforcing elements are positioned to extend radially on said end plate.

20. The electromagnetic clutch of claim 19 wherein said first rotatable member further includes an inner cylindrical portion and an outer cylindrical portion and wherein said slits on said end plate are defined between said inner and outer cylindrical portions.

21. The electromagnetic clutch of claim 20 wherein said reinforcing elements each extend entirely between said inner and outer cylindrical portions.

22. The electromagnetic clutch of claim 20 wherein said end plate defines said slits on a plurality of concentric circles and wherein each said reinforcing element extends from said inner cylindrical portion to a point beyond at least one of said concentric circles but short of at least one of said concentric circles.

23. The electromagnetic clutch of claim 20 wherein each said reinforcing element is tapered toward said outer cylindrical portion.

* * * * *